July 5, 1932.   A. ZINECKER   1,865,997
AUTOMATIC GEAR SHIFTING DEVICE
Filed Jan. 9, 1932   5 Sheets-Sheet 1

ARTHUR ZINECKER
INVENTOR.

BY Erich J. Michaelis
ATTORNEY.

July 5, 1932. A. ZINECKER 1,865,997
AUTOMATIC GEAR SHIFTING DEVICE
Filed Jan. 9, 1932 5 Sheets-Sheet 2
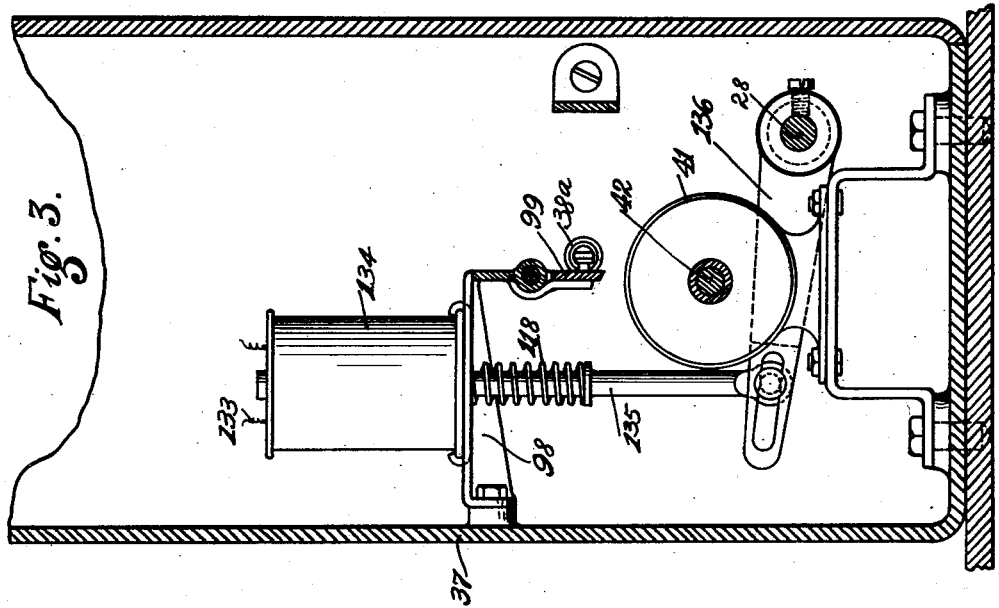
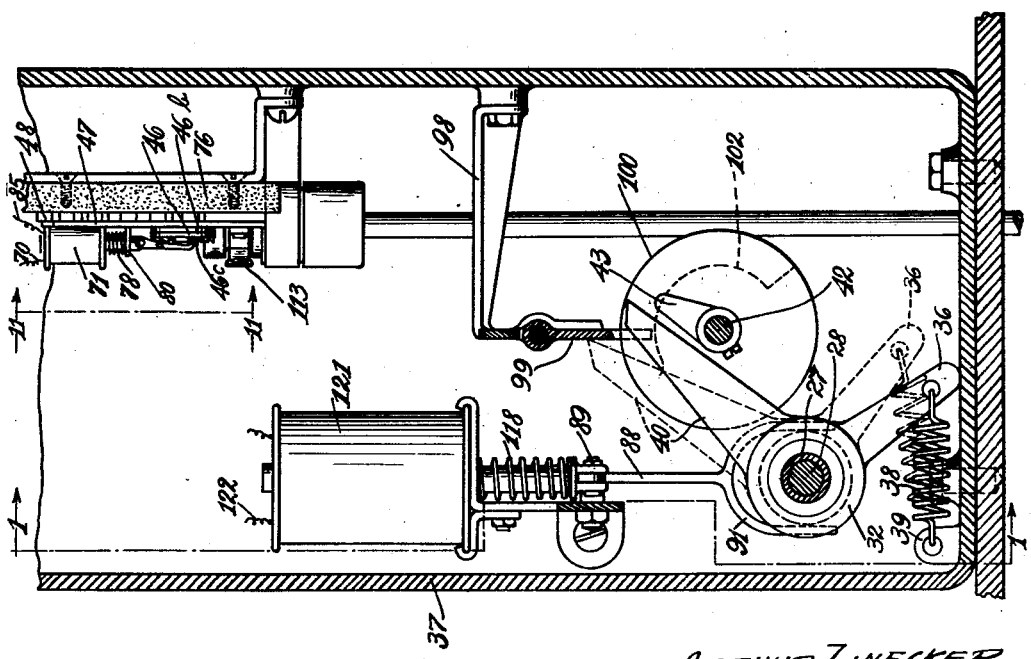
ARTHUR ZINECKER
INVENTOR.
BY Erich J. Michaelis
ATTORNEY.

July 5, 1932.  A. ZINECKER  1,865,997
AUTOMATIC GEAR SHIFTING DEVICE
Filed Jan. 9, 1932  5 Sheets-Sheet 3
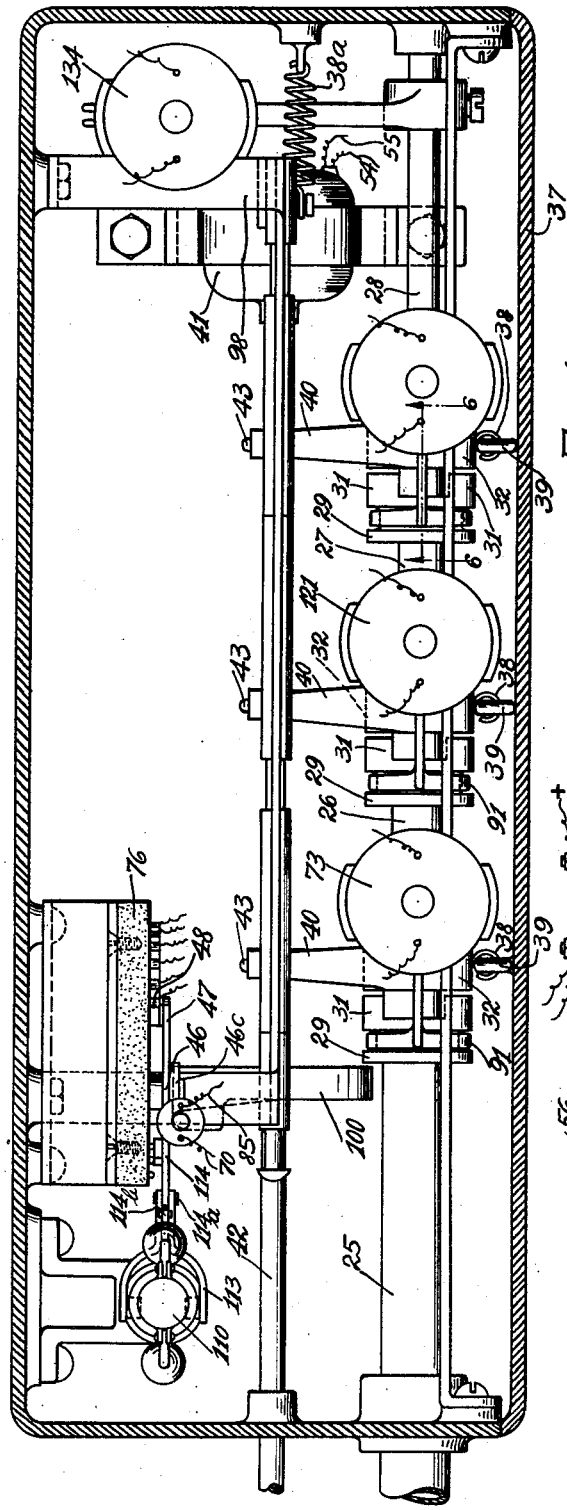
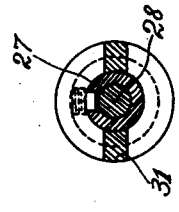
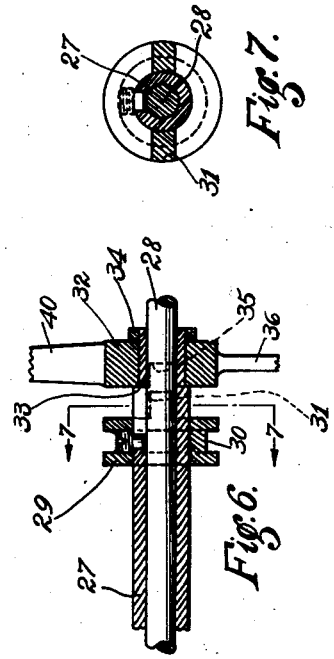
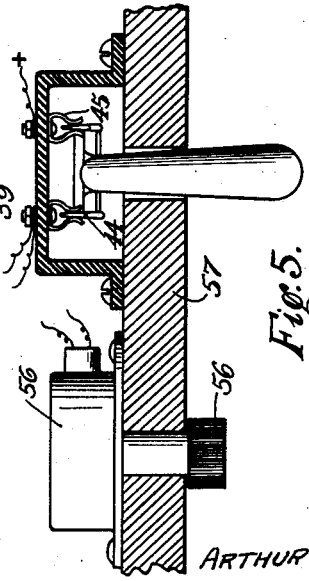
ARTHUR ZINECKER
INVENTOR.
BY *Erich P Michaelis*
ATTORNEY.

July 5, 1932.  A. ZINECKER  1,865,997
AUTOMATIC GEAR SHIFTING DEVICE
Filed Jan. 9, 1932   5 Sheets-Sheet 4
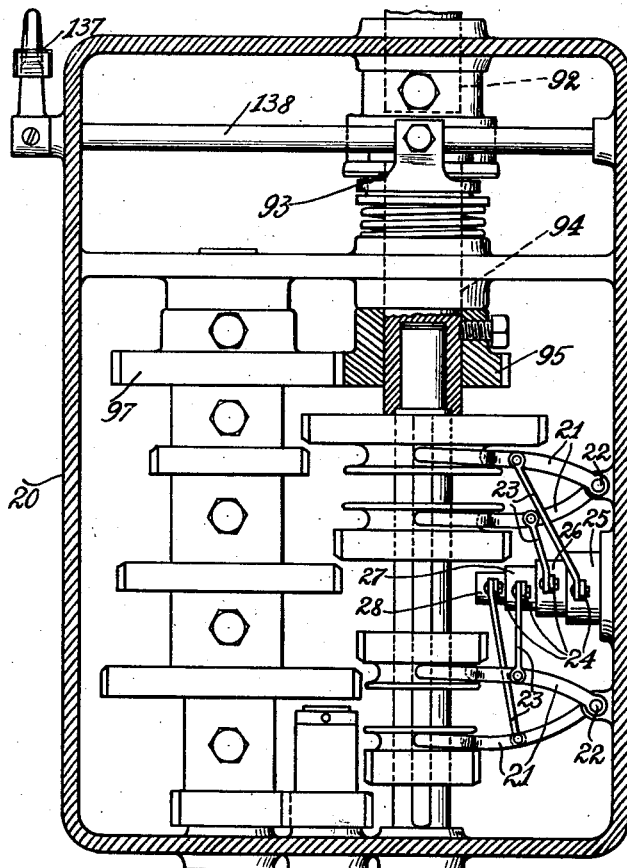
Fig. 8.
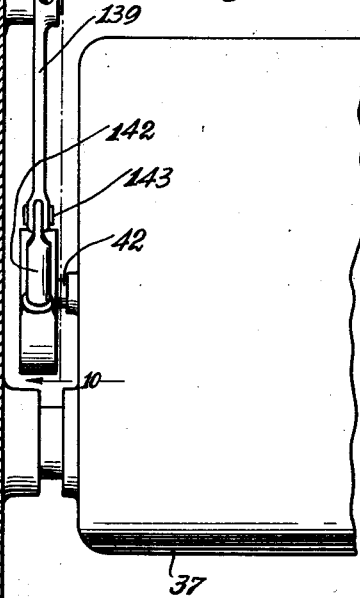
Fig. 9.
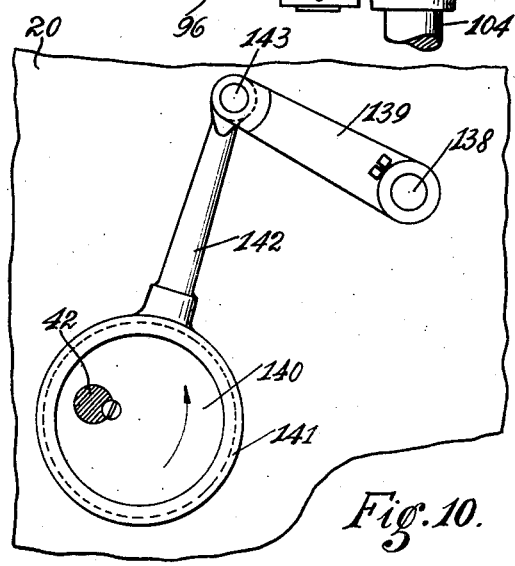
Fig. 10.
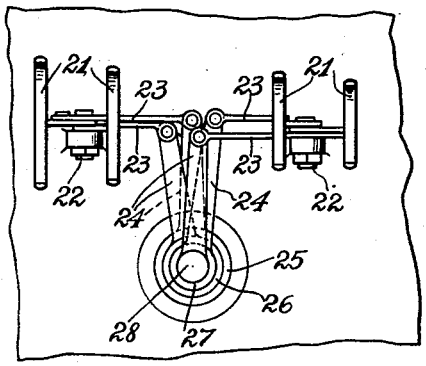
ARTHUR ZINECKER
INVENTOR.
BY Erich J. Michaelis
ATTORNEY.

July 5, 1932.  A. ZINECKER  1,865,997
AUTOMATIC GEAR SHIFTING DEVICE
Filed Jan. 9, 1932   5 Sheets-Sheet 5

ARTHUR ZINECKER
INVENTOR.

BY Erich H. Michaelis
ATTORNEY.

Patented July 5, 1932

1,865,997

UNITED STATES PATENT OFFICE

ARTHUR ZINECKER, OF CHICAGO, ILLINOIS

AUTOMATIC GEAR SHIFTING DEVICE

Application filed January 9, 1932. Serial No. 585,767.

The invention relates to automatic shifting devices for automobile transmissions.

The object of the invention is to provide a mechanism which automatically will shift the gears of an automobile transmission from one speed into the other depending entirely on the momentum of the automobile.

Other objects of the invention not specifically mentioned will be easily ascertained and understood from the following description in connection with the accompanying drawings forming a part thereof. It is, however, to be understood that the invention is not to be limited or restricted to the exact formation and construction shown in the drawings and described in the specification, but that the invention is only to be limited by the scope of the claims appended hereto.

In the drawings illustrating a preferred embodiment of the invention

Fig. 1 is a sectional view taken on lines 1—1 in Fig. 2 and showing diagrammatically the arrangement of the shifting device according to the present invention.

Fig. 2 is a sectional view taken on lines 2—2 in Fig. 1.

Fig. 3 is a sectional view taken on lines 3—3 in Fig. 1.

Fig. 4 is a top view of Fig. 1.

Fig. 5 is a detail view of two electric switches used in connection with the apparatus according to the present invention, said switches being attached to the instrument board.

Fig. 6 is a sectional view taken on lines 6—6 in Fig. 4.

Fig. 7 is a sectional view taken on lines 7—7 in Fig. 6.

Fig. 8 is an illustration of the transmission connected to the apparatus according to the present invention, and of the clutch pedal used in connection with this apparatus.

Fig. 9 is an end view of the different concentric shafts used in connection with the device according to the present invention.

Fig. 10 is a sectional view taken on lines 10—10 in Fig. 8.

Figure 11:
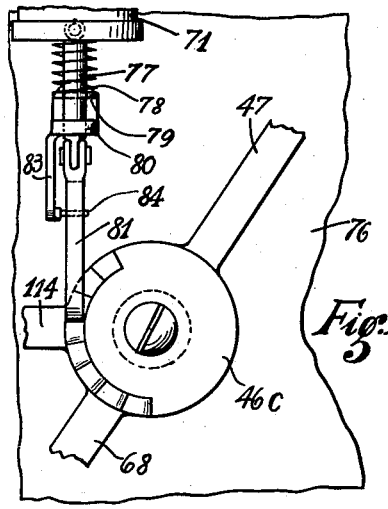

Fig. 11 is a detail view taken on line 11 in Fig. 2.

Figure 12:
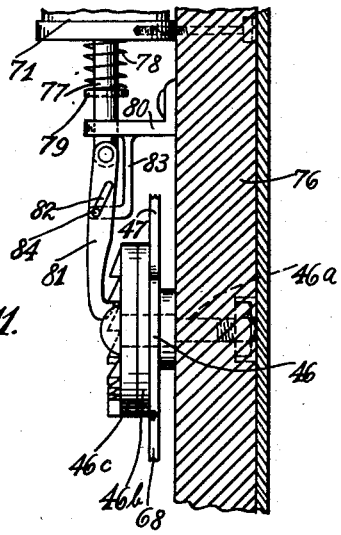

Fig. 12 is a side view of Fig. 11.

Figure 13:
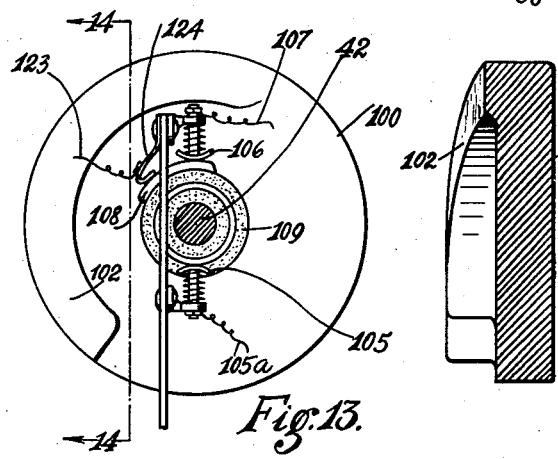

Fig. 13 is a detail view of a cam disc and some electric connections used in connection with the device according to the present invention.

Figures 14, 15:
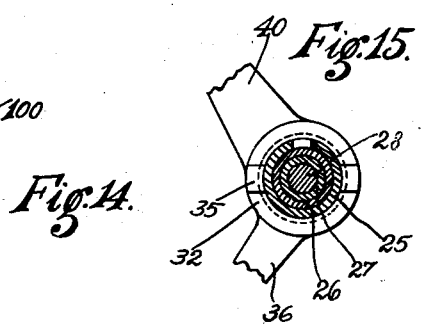

Fig. 14 is a sectional view taken on line 14—14 in Fig. 13.

Figure 1:
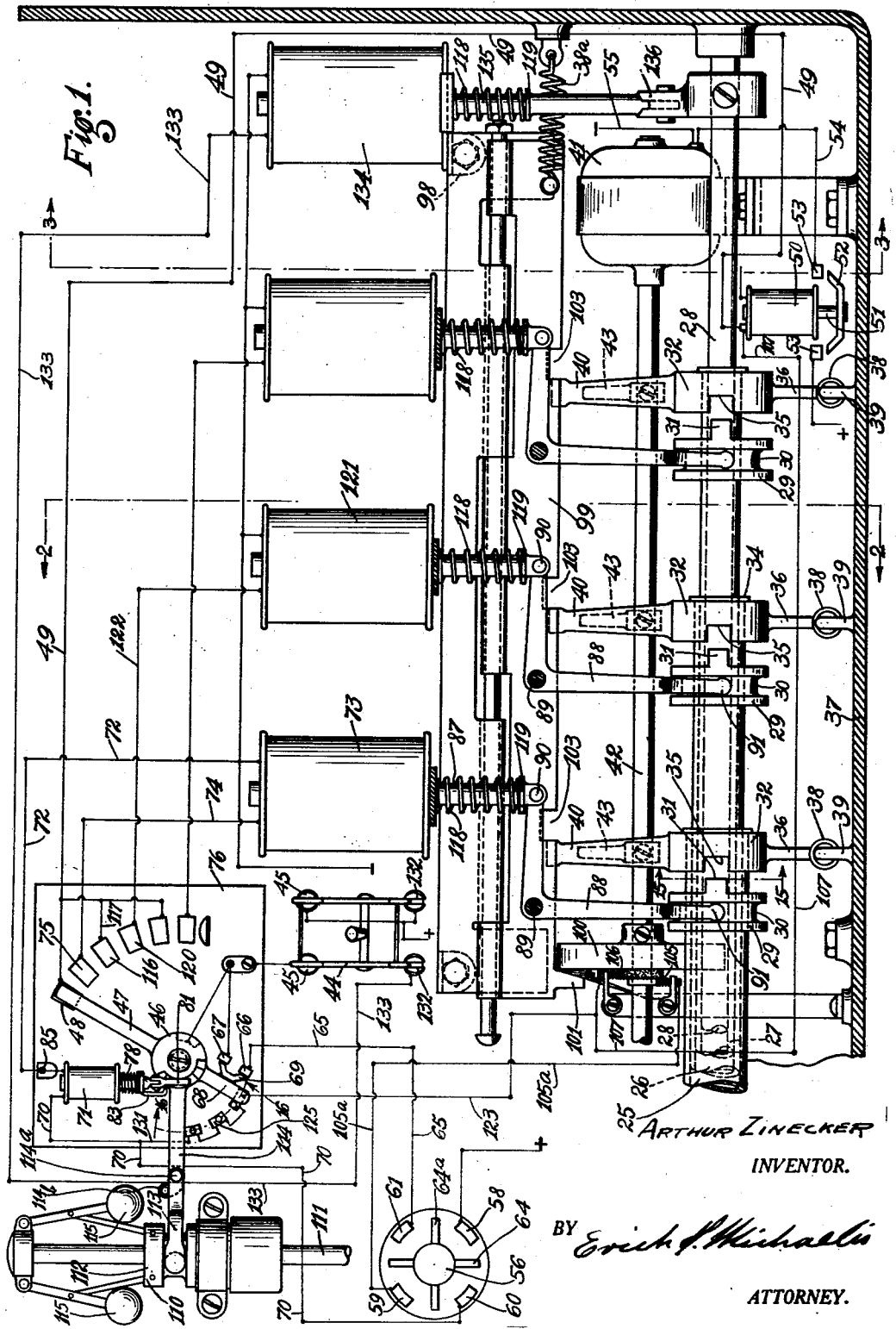
Figure 16:
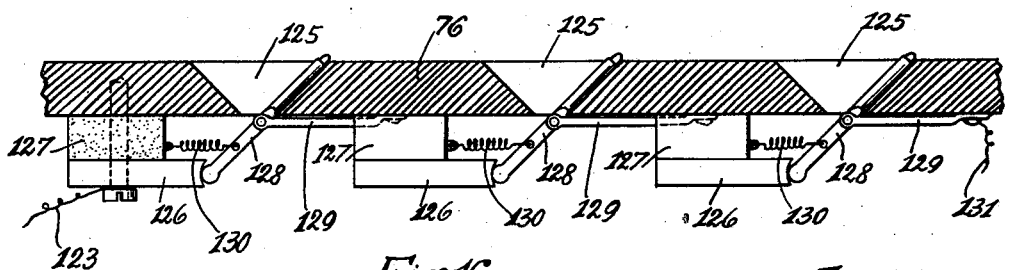

Fig. 15 is a sectional view taken on lines 15—15 in Fig. 1, and,

Fig. 16 is a sectional view taken on lines 16—16 in Fig. 1.

In a housing 20 an automobile transmission of any known and desired construction is arranged, and the movable transmission gears are adapted to be moved by means of yokes or fingers 21 pivotally mounted inside of the transmission housing 20 as indicated at 22. On the fingers 21 rods 23 are pivotally fastened with one of their ends, and the other ends of these rods are pivotally connected to levers 24 rigidly attached each to a shifting shaft to be described later on.

The outer shifting shafts are hollow shafts and are arranged concentrically. The innermost of said shafts may be a regular shaft instead of a hollow shaft. The outer hollow shaft 25 is rotatable about the second hollow shaft 26, and this shaft is rotatable about the hollow shaft 27 which in turn is rotatable about the innermost shaft 28. On each of these shafts with the exception of the innermost shaft a shifting clutch is mounted, consisting of a part 29 which is slidably arranged on the corresponding shifting shaft but is prevented from rotary movement in relation to said shaft. Each of said clutch parts is provided with a circular groove 30 for a purpose to be described later on and with a pair of diametrically extending lugs 31 which are arranged on the surface opposite a second part 32 of the shifting clutch. This second part of the clutch is rotatably mounted on the shifting shaft but is prevented from axial movement by being arranged between a shoulder 33 on the shifting shaft and a ring 34 pressed onto said shaft.

The second clutch part 32 is provided with a pair of diametrically extending grooves 35 adapted to receive the lugs 33 of the first clutch part when said part is moved into working position so that the lugs 33 will engage the groove 35. On the second clutch part a lever arm 36 is formed and extends downwardly and inwardly of a housing 37 adapted to receive the apparatus for actuating the fingers 21 in the transmission housing. A spring 38 is fastened with one of its ends to the lever arm 36, and the other end of the spring 38 is fastened to a lug 39 provided in the housing 37. At an angle to the lever arm 36 and extending upwardly and inwardly of the housing 37 a second lever arm 40 is formed on the second clutch part.

A shifting motor 41 has a shaft 42 which is arranged in relation to the concentrical shifting shafts as illustrated in Figs. 2 and 3, that means, upwardly and inwardly of the housing 37. On the shaft 42 a lifting cam or lever 43 is fastened so that it will engage the lever arm 40 when the motor 41 is energized and rotates the shaft 42. For each lever arm 40 a lifting cam 43 is provided so that all the rotatable parts 32 of the shifting clutches will be given a partial rotary movement about the corresponding shifting shaft when the lifting cam 43 engages the corresponding lever arm 40.

In order to energize the motor 41 a knife switch 44 is adapted to be electrically connected with switch posts 45 which in turn are connected with the battery (not shown) with which every automobile is equipped. The switch is then electrically connected with a disc 46 on which a lever is formed or fastened having three arms, one of said lever arms, namely the arm 47, is in contact with a contact plate 48, when the automobile is standing still. From said contact plate a wire 49 leads to an electro magnet 50 which has an armature 51. On this armature a bridge contact 52 is fastened, adapted to contact with terminals 53, inserted in a wire 54, leading from the battery (not shown) to the motor 41. The motor is provided with a ground wire 55 and when the knife switch 44—45 is closed the electro magnet 50 will be energized, attracting the armature 51 and thereby closing the contact between the bridge 52 and the post 53 so that the motor will be energized and will rotate the shaft 42.

The knife switch 44—45 and a rotary switch 56 are preferably located on the dash board 57 as indicated in Fig. 5. The rotary switch is a double acting switch and is provided with two pairs of contact plates, 58 and 59, and 60 and 61 respectively. The rotor of said switch is equipped with two brushes 64 and 64a respectively. The contact plates belonging together are arranged in the same plane, but the two pairs are located in different, but parallel planes. The brush 64 can contact the plates 58 and 59. In Fig. 1 the switch is indicated in open position. From the plate 61 an electric wire 65 leads to a terminal post 66, and a second post 67 is connected with the knife switch 44—45. On the second lever arm 68 of the ratchet disc 46 a bridge contact 69 is fastened, adapted to contact with the two posts 66—67. From the plate 60 on the rotary switch a wire 70 leads to an electromagnet 71 and a wire 72 leads from this electromagnet to the first shifting electromagnet 73. Another conductor 74 connects the shifting magnet 73 with a plate 75 arranged adjacent the plate 48. The lever disc 46 is rotatably fastened to an insulation plate 76 attached to the wall of the housing 37, by means of a stud 46a. Over the lever plate a friction plate 46b is rotatably arranged on the same stud and a ratchet wheel 46c having ratchet teeth on its outer face is also rotatably mounted on said stud. When either the ratchet wheel or the lever plate is rotated this movement will be transmitted to the other part through the friction plate. The electromagnet 71 is also fastened to this plate and the contact plates 48 and 75 are arranged on the same plate. The electromagnet 71 is provided with a sliding armature 77 which is surrounded by a spring 78. One of the ends of this spring abuts the bottom plate of the electromagnet 71 and the other end abuts a pin 79 extending through the armature 77. This spring will urge the armature outwardly of the electromagnet when the electromagnet is not energized. A guide bracket 80 is fastened to the insulation plate 76 and the outer end of the armature 77 is slidably arranged in a hole provided in said bracket. On the open end of the armature a hook rod 81 is pivotally joined and in this hook arm a slot 82 is provided extending diagonally of said arm. On the bracket 80 a second anchor bracket 83 is fastened, carrying a pin 84, extending through the slot 82. When the electromagnet is not energized, the spring 78 forces the anchor 77 outwardly of the electromagnet 71 so that the pin 84 will be located on the upper end of the slot 82, whereby the hook arm 81 will be moved away from the ratchet disc 46c. When then the rotor 56 of the rotary switch will be rotated so that the brush 64 will contact the plates 60 and 61, a circuit will be established from the source of electricity through the knife switch 45 to the post 67, through the bridge 69 to the post 66, through the conductor 65 to the plate 61, through the brush 64 to the plate 60, and through the conductor 70 to the electromagnet 71 which is grounded as indicated at 85. In this manner the electromagnet 71 is energized and the armature 77 is moved inwardly of said magnet against the pressure of the spring 78. During this movement the hook arm 81 will be forced toward the ratchet disc 46c through the sliding movement of the slot 82 on the pin 84 so that the hook portion of the hook arm will engage one of the teeth of the ratchet disc 46c and will rotate said disc and by means of the friction disc also the lever plate. Through this movement the lever arm 47 on said plate will be moved into contact with the contact plate 75 and at the same time the bridge 69 fastened to the short arm 68 of the triple lever will be moved away from the posts 66 and 67, breaking the circuit described above. From the contact plate 75 a conductor 74 leads to the first shifting magnet 73 so that now another circuit is established from the source of the electricity through the knife switch to the lever disc, the lever arm 47, contact plate 75, conductor 74, the spool of the electromagnet 73, and through the wire 72 back to the ground 85. In this manner the electromagnet 73 will be energized attracting the armature 87.

A bell crank lever 88 is pivotally supported at 89 in the housing 37 and one of the arms of said bell crank is pivotally connected at 90 with the armature rod 87. The other arm of the bell crank lever is at its end shaped into a yoke 91, the ends whereof are arranged in the groove 30 of the slidable part 29 of the shifting clutch.

When the electromagnet 73 is energized by the contact of the arm 47 with the plate 75, and the armature rod 87 is thereby moved inwardly of the electromagnet 73, the bell crank lever is pivoted about its pivot 89, and the sliding part 29 of the shifting clutch is moved toward the rotary part 32 of the clutch so that the lugs 31 will engage the grooves 35.

The part of the devices described so far operates as follows:

The gasoline motor driving the automobile is started in the usual manner and is running idle, that means that the motor shaft 92, indicated in Fig. 8, is being rotated and that when the clutch indicated at 93 in Fig. 8 is thrown in the stub shaft 94, will be set into rotary motion and by means of a gear 95 a transmission shaft 96 will be rotated since the gear 95 is in mesh with a gear 97 on the transmission shaft. It is to be noted, that any suitable transmission may be used and that the transmission shown in the drawings and partly described here is only a preferred embodiment of a transmission to be used in connection with the shifting device according to the present invention.

When then the knife switch 44—45 is closed as described above, and thereby the shifting motor 41 is energized so that the shaft 42 of the shifting motor is being rotated, the lifting cams or levers 43 will engage the lever arms 40 of the rotatable part 32 of the shifting clutches and will start to move them from the position shown in Fig. 2 in full lines into the position shown in the same Fig. 2 in dotted lines. The arm 36 will also be brought into the position shown in dotted lines in Fig. 2, and the spring 38 will be extended.

In the housing 37 a plurality of U shaped brackets 98 are arranged on which a resting plate 99 is pivotally and slidably supported. When the lifting arm 43 moves the lever arms 40, the latter will pivot the plate 99 so that the lever arms 40 may pass by. When the lifting arms 43 are disengaged from the lever arms 40, the springs 38 will force the lever arms 40 against the resting plate which will prevent the arm and the rotating part 32 of the shifting clutch from returning into the position shown in full lines in Fig. 2, since the plate is prevented from moving toward the right in Fig. 2 or to the left in Fig. 3 by a part of the brackets 98 abutting the plate 99.

On the shaft 42 of the shifting motor 41 a cam disc 100 is rigidly fastened, and on the plate 99 a nose 101 is formed. The cam portion 102 of the disc 100 will engage the nose 101 of the plate 99 during the rotation of the shaft 42 so that the plate 99 will be forced toward the left in Fig. 1. The plate 99 is provided with notches 103, and when the plate is forced toward the left, the lever arms 40 will come into registration with these notches so that the arms will be forced downwardly under the pressure of the springs 38. Unless the plate 99 is forced toward the left in Fig. 1 by the cam 102, the plate 99 is held in its position shown in Fig. 1 or is returned into said position by means of a spring 38a fastened with one of its ends to the plate and with its other end to the housing 37.

After the knife switch 44—45 has been closed, the rotary switch 56 is also closed so that the lever arm 47 of the triple lever will be moved, as described above, into contact with the plate 75 whereby the clutch part 29 will be forced into engagement with the clutch part 32. In this manner the hollow shaft 25 will be rotated when the lifting cam 43 moves the lever arm 40. To the end of the hollow shaft 25 the one of the fingers 21 is connected, which will move then one of the transmission gears into mesh with one of the gears on the transmission shaft 96 so that the driving shaft 104 will be rotated, which drives the driving wheels of the automobile.

In order to prevent the shifting motor 41 from stopping immediately after the lever 47 of the triple lever leaves the contact plate 48 and before the gears are shifted, the contact plate 58 is connected with the source of electricity in the automobile. A brush 105 is provided which is connected with the plate 59 of the rotary switch by means of a conductor 105a. This brush is in permanent contact with a circular contact plate, fastened to but insulated from the shaft 42 of the shifting motor. A second brush 106 is provided which is electrically connected by means of a conductor 107 with the electromagnet 50 which closes the circuit for the shifting motor 41. A short arched contact plate 108 surrounds a part of an insulation 109 which is fastened to the contact on which the brush 105 rides. The plate 108 is electrically connected with this circular plate, and when the brush 106 contacts with the arched plate 108, the electromagnet 50 will be energized so that the motor 41 will be fed by the circuit described. This will keep the motor running after the lever 47 is in contact with the plate 75 so that the lever arm 40 will be completely lifted by the lifting cam 43, and the transmission gear connected with the hollow shaft 25 will be shifted into working position, so that now the automobile will be driven in first speed.

A regulator 110 of any suitable and known construction is driven by the rotation of the driving wheels (not shown) of the automobile in a similar manner as a speedometer or the like, by means of a driving shaft 111. In the sliding part 112 of the regulator a groove is provided in which a yoke 113 is located which is pivotally attached on the third arm 114 of the triple lever mentioned before as shown at 114a in Figs. 1 and 2. One of the pivotally connected members is forked on the abutting end, the fork receiving the end of the other member. Each of the fork parts is provided with lugs 114b extending to both ends beyond the upper and lower side of the male part and through said lugs above and below the male member a pin extends at a distance from said member, so that the pivotal connection of the two members in relation to each other is limited by said pins. When then the triple lever is pivoted by means of the electromagnet the arm 47 may be moved into contact with the contact plate adjacent the one with which the arm is in contact, even when the regulator stands still or is retarding its rotary speed. When by means of the speed of the vehicle the balls 115 of the regulator are lifted upwardly so that the sliding ring 110 moves also upwardly, the triple lever is pivoted so that the contact arm 47 of said lever will be moved onto the contact plate 116, fastened to the insulation plate 76 adjacent the contact plate 75. It is to be noted that before this happens, and while the transmission is in first speed, the motor 41 has stopped, and the shaft 42 is not being rotated any more. When then the contact arm 47 of the triple lever is in contact with the plate 116, a circuit is closed from the source of electricity to the knife switch, the lever disc, the contact arm 47, the contact plate 116, a conductor 117 which leads to conductor 49, through this conductor 49 to the electromagnet 50, energizing the same so that the contacts 52—53 will be closed, starting the shifting motor 41. When this motor is started, the shaft 42 is also rotated again so that the cam disc 100 will be set in motion and the cam portion 102 will engage the nose 101 of the plate 99, moving said plate toward the left in Fig. 1, whereby the arms 40 of the shifting clutches will be brought into registration with the notches 40 in the plate 99, permitting the springs 38 to return the clutches into the position shown in full lines in Fig. 2. Thereby the transmission gear of the first speed will be put out of mesh with the corresponding driving gear. At the same time that the lever 47 leaves the contact plate 75, the shifting electromagnet 73 will be disengaged so that a spring 118, which surrounds the armature rod 87 of the electromagnet 73 and which abuts with one of its ends the end plate of said magnet and with the other end a pin 119, extending through the armature rod, can force said rod outwardly of said electromagnet thereby pivoting the bell crank 88 into the position shown in Fig. 1 so that the two parts of the first shifting clutch will be disengaged from each other. When then the speed of the automobile is great enough so that the transmission should be meshed for second speed, the regulator will bring the contact arm 47 of the triple lever into contact with the contact plate 120, whereby the second shifting electromagnet 121 will be energized by means of a current conducted from the source of electricity through the knife switch 44 and 45, the lever disc, the contact arm 47, the contact plate 120, and a conductor 122, leading from the contact plate to the second speed shifting magnet 121. At the same time the motor 41 will rotate the shaft 42 so that the lever arm 40 of the second speed shifting clutch will be lifted together with the other arms 40 into the position shown in dotted lines in Fig. 2. The sliding part 29 of this second speed clutch will be put into engagement with the rotary part of said clutch in the same manner as described before with regard to the first speed clutch. This sliding movement of the clutch part will occur before the rotary part will be rotated in order to rotate the sliding part and the corresponding shifting shaft, so that the desired gear shifting operation will be executed.

The motor 41 is kept running after the contact arm 46 is moved over to the contact plate 120 in the same manner as described above, when the contact arm 47 was moved onto the plate 75, namely by means of the brushes 105 and 106 and the conductor 107. In order to be able to energize the electromagnet 71 and to shift the triple lever, a conductor 123 is attached to a brush 124, adapted to contact with the curved contact plate 108 during the rotation of the shaft 42 of the shifting motor 41. In the insulation plate 76 a plurality of conical openings 125 are provided, and underneath the plate a plurality of contact plates 126 are arranged and spaced from the lower surface of the insulation plate by means of insulation blocks 127. In each of said conical holes a two arm contact lever 128 is arranged, pivotally held intermediate its ends by a contact bracket 129, fastened underneath the insulation plate 76. A spring 130 is fastened with one of its ends to each of the insulation blocks 127 and with its other end to the lower part of the adjacent contact lever 128, thereby forcing said lever arm into contact with the corresponding contact plate 126. The conductor 123 is attached to the first contact plate 126, and the last contact bracket 129 is electrically connected by means of a conductor 131 to the conductor 70, leading to and energizing the electromagnet 71 so that the electromagnet will shift the triple lever whenever the motor 41 is rotated.

It is easy to see that in this manner as many speeds as may be desired can be obtained by arranging the necessary number of shifting electromagnets and providing for the necessary number of concentric shafts.

When the triple lever is moved in clockwise direction, the short arm 68 will slide over the upper ends of the contact levers 128, always leaving the circuit between the conductors 123 and 70 closed.

When the speed of the automobile is decreased for any reason whatsoever, be it that the automobile is travelling upwardly on a steep grade, or that the driver reduces the feed of gas, the regulator balls will move downwardly thereby moving the triple lever in counterclockwise direction. When this happens, it is necessary to break the circuit energizing the electromagnet 71 which otherwise would try to move said triple lever in clockwise direction. This breaking of the circuit is obtained by the short lever 68 of the triple lever, engaging the upper part of one of the contact levers 128 and pivoting it so that the contact between said lever and the corresponding contact plate 126 will be broken. The upper part of the lever 128 will swing toward the left in Fig. 16 until it reaches the left hand wall of the opening 125 in which the lever is located. This wall is arranged so far from the pivotal point of the lever that the upper end of said lever will be beneath the upper surface of the insulation plate 76 so that the arm 68 may slide over said contact lever. In this manner the triple lever may be returned to its original starting point as shown in Fig. 1.

When it is desired to reverse the travel of the automobile, the apparatus will be put into neutral position, that means, in the position shown in Fig. 1, and then the blades 44 of the knife switch will be put into connection with the terminal posts 132 which are connected on one side with the source of electricity in the automobile, and from which on the other side a conductor 133 leads to a shifting electromagnet 134. This electromagnet has an armature rod 135 which is pivotally connected to a lever arm 136, rigidly mounted to the innermost concentric shaft 28, mentioned above. When the shifting magnet 134 is energized and the armature rod 135 is moved inwardly of said magnet, the shaft 28 is rotated, shifting the finger 21 which in turn moves a transmission gear into mesh with the usual idler which is always in mesh with the reverse gear of the transmission shaft. When the knife switch is opened and the electromagnet is thereby disenergized, a spring 135 abutting the end of the magnet and a pin extending through the armature rod 135 will return the parts into the position shown in Fig. 1 and thereby the reverse gears will be disengaged from each other.

It is clearly shown that the shifting of the gears into the different speeds will occur automatically, depending entirely on the speed with which the automobile travels. If the speed of a motor vehicle is to be changed and the transmission gears are to be shifted, it is practically necessary to disconnect the shaft of the vehicle motor from the driven shaft by disconnecting the clutch. This is easily done by actuating a pedal lever 137, shown in Fig. 8, which is rigidly fastened to a clutch shaft 138. In the present construction this shaft 138 extends through the transmission housing 20, and on its end a lever 139 is rigidly fastened.

On the outer end of the shaft 42 of the shifting motor 41 an eccentric disc 140 is fastened and a ring 141 surrounds this eccentric disc. The disc is rotatable in said ring. On the ring a connecting rod 142 is either formed or rigidly fastened in any convenient manner and the outer end of the rod 142 is pivotally connected to the lever 139 as indicated at 143 in Figs. 8 and 10.

It is easy to see, that every time when the shifting motor is energized so that the shaft 42 will be rotated, the clutch shaft 138 will receive a rotary movement exactly as if the clutch lever 137 would be actuated, and since during the rotation of the shaft 42 of the shifting motor the shift gears of the transmission are being operated, this operation will be performed while the clutch 93 through the rotation of the clutch shaft 138 is disconnected.

Having described my invention and how the same is to be performed, I claim as new and desire to secure by Letters Patent:

1. In a device of the class described in combination with an automobile transmission a plurality of shifting shafts extending concentrically to each other, means for rotating said shafts, means connected to each of said shafts for shifting a transmission gear selectively in and out of mesh, when said shafts are rotated, a shifting lever rotatably mounted on each of said shafts, a shaft extending parallel to the shifting shafts, a shifting motor adapted to rotate said shaft, a plurality of actuating cams rigidly mounted on the shaft driven by the motor and adapted to engage and pivot the shifting levers on the shifting shafts, a clutch on each shifting shaft adapted to couple each shifting lever to the corresponding shifting shaft, means for selectively actuating one of said clutches for coupling and uncoupling the corresponding clutch, and means for reversing the pivotal movement of the shifting levers.

2. In a device of the class described in combination with an automobile transmission and a gear shifting device, a shifting motor adapted to actuate a part of said shifting device, means for interruptedly feeding said motor with electric current, said means consisting of a source of electricity, a knife switch connected with said source of electricity, a contact arm pivotally mounted, a plurality of contact plates, a conductor leading from each alternate plate to an electromagnet arranged in the conductor leading to the motor, a spring urging the armature of said magnet away therefrom, a switch in the motor circuit adapted to be closed when the magnet is energized, a ratchet wheel frictionally connected with the contact arm, a second electromagnet, an armature on said magnet and a hook shaped member on the armature adapted to engage the ratchet teeth of the ratchet wheel when the second electromagnet is energized so that the contact arm will be moved from a contact plate which is connected with the magnet energizing the shifting motor to the adjacent plate which is electrically connected with means for actuating the other part of the gear shifting means.

3. In a device of the class described in combination with an automobile transmission a plurality of shifting shafts extending concentrically to each other, means for shifting each transmission gear independently of the others, said means being adapted to be operated by the rotary movement of the shifting shafts, a shifting motor, a shaft driven by said motor and extending parallel to the shifting shafts, a shifting lever rotatably mounted on each shifting shaft, a clutch on each shifting shaft adapted to couple the shifting lever to the corresponding shifting shaft, means for selectively operating said clutches in and out of working position, a plurality of actuating cams rigidly mounted on the shaft driven by the motor, said cams being adapted to engage and pivot the shifting levers, a resting plate having a plurality of notches therein and pivotally and slidably arranged in the path of the movement of the shifting levers caused by the actuating cams, springs urging the shifting levers in opposite direction from that in which said levers are forced by the actuating cams, a stop permitting the shifting levers to pivot the plate so that said levers may pass said plate when engaged by the actuating cams, but preventing pivotal movement of said plate when the shifting levers will be forced against the plate by the springs, and cooperating cam surfaces on the plate and on the shaft driven by the shifting motor, said surfaces being adapted to impart lengthwise sliding movement to the plate, through which movement the notches come into registration with the shifting levers so that the spring may pivot the levers into opposite direction as the actuating cams.

4. In a device of the class described in combination with an automobile transmission, a plurality of shifting shafts, extending concentrically to each other, means for selectively shifting gears of the transmission in and out of mesh, said means being actuated by rotation of the shifting shafts, a shifting motor, a source of electricity, a switch connected with said source of electricity, a lever disc electrically connected with said switch, a contact lever rigid on said disc, said disc being rotatably supported, a plurality of contact plates arranged so that the contact lever can contact with the plates when the arm is pivoted by rotation of the lever disc, a ratchet disc arranged back to back with the lever disc, a friction disc located between the two other discs connecting them frictionally, the ratchet teeth being formed on the outer face of the ratchet disc, the first, third, etc. contact plate being electrically connected with the electromotor, a conductor connecting the source of electricity with the shifting motor, a normally open switch inserted in said conductor, the electromagnet being adapted to close said switch when the magnet is energized so that the motor is started, a shaft extending parallel to the shifting shafts and adapted to be driven by the shifting motor, a shifting lever rotatably mounted on each of the shifting shafts, a clutch on each of the shifting shafts adapted to couple the shifting lever to the corresponding shifting shaft, a second lever arm on the lever disc, a bridge contact on said lever arm, a pair of contact posts adapted to contact with the bridge contact, one of said posts being electrically connected with the first mentioned switch, a rotary switch, the second post being electrically connected with one of the poles of the rotary switch, a second electromagnet, a conductor connecting the second pole of the rotary switch with said electromagnet, a sliding armature on said electromagnet, a hooked member on the armature and adapted to engage one of the teeth of the ratchet disc every time when the rotary switch is closed, thereby moving the first contact lever to the contact plate adjacent the plate with which the lever contacts, a third electromagnet electrically connected with this second contact plate, a sliding armature on the third electromagnet, a spring forcing said armature outwardly of the electromagnet when the latter is not energized, and a bell crank pivotally mounted and pivotally connected to said armature engaging the clutch on the corresponding shifting shaft so that said clutch will couple the shifting lever to said shaft when the third electromagnet is energized, a plurality of actuating levers rigidly mounted on the shaft driven by the shifting motor and adapted to simultaneously engage all the shifting levers thereby pivoting them about the corresponding shifting shafts with the exception of the one on which the clutch has coupled the lever to the shaft so that the shaft will also be rotated, and a plurality of springs adapted to urge the shifting levers into the position in which they were before the actuating levers engaged them.

5. In a device of the class described in combination with an automobile transmission a plurality of shifting shafts extending concentrically to each other and into the transmission case, means for shifting the transmission gears selectively, said means being adapted to be actuated by rotary movement of the shifting shafts, a shifting lever rotatably mounted on each of said shifting shafts, a clutch on each shifting shaft adapted to couple the shifting lever to the corresponding shifting shaft, an electromagnet for each shifting shaft, and means inserted between each electromagnet and the clutch on the corresponding shifting shaft for moving said clutch in that position in which the shifting lever is coupled to its shifting shaft, the means interposed between the electromagnet and the shifting shaft moving the clutch into working position when the electromagnet is energized, a spring actuating the interposed means to disconnect the shifting lever from the clutch when the corresponding electromagnet is disenergized, an electro motor, a shaft adapted to be driven by said motor and extending parallel to the shifting shafts, a plurality of actuating cams on said motor driven shaft, said cams being adapted to engage and lift the shifting levers on the shifting shafts, a resting plate slidably and pivotally arranged on the path of the movement of the shifting levers created by the lifting cams, a spring urging said plate toward one end thereof, stubs for permitting pivotal movement of the plate in one direction only, a notch being provided in the plate adjacent each shifting lever, a cam nose on said plate, a cam plate on the motor driven shaft, said cam plate being adapted to engage the cam nose on the plate and force said plate in the opposite direction in which the plate is urged by the spring whereby the shifting levers will get into registering position with the corresponding notches in the plate, a plurality of contact plates arranged adjacent to each other in the shape of an arch, a contact arm adapted to contact with all said contact plates in rotation, a source of electricity, a knife switch connected therewith, a shifting electromagnet having an armature, a hook member pivotally fastened to said armature, a ratchet disc pivotally mounted, said hook member adapted to engage said plate and move the same in rotary direction, a disc rigidly fastened to the contact arm and arranged concentrically with the ratchet wheel, a friction disc arranged between the other two discs and connecting them frictionally, a conductor connecting the electromagnet electrically with the knife switch, a second conductor connecting said knife switch with the lever disc, the first, third, fifth, etc. connecting plate being electrically connected with another electromagnet, a conductor connecting the electro motor with the source of electricity, a normally open switch inserted in said conductor, the last named electromagnet being adapted to close said switch when said electromagnet is energized, the second, fourth, sixth, etc. contact plate being electrically connected with the shifting magnets for the different shifting shafts, so that one of said magnets will be energized when the contact arm contacts with the corresponding contact plate.

6. In a device of the class described in combination with an automobile having a transmission case containing transmission gears a plurality of shifting shafts extending concentrically to each other, means on each shifting shaft adapted to engage one of the transmission gears and to shift said gear upon rotation of the corresponding shaft, a shifting lever rotatably mounted on each shifting shaft, a clutch slidably mounted on each shifting shaft and adapted to couple each shifting lever to its corresponding shifting shaft, a shifting motor, a shaft adapted to be driven by said motor and extending parallel to the shifting shafts, a plurality of lifting cams rigidly mounted on said motor driven shaft and arranged so, that each cam will engage and lift one of the shifting levers, a source of electricity, an electric conductor from said source of electricity to the shifting motor, a normally open switch inserted in said conductor, an electromagnet adapted to close said switch when said magnet is energized, a knife switch electrically connected with the source of electricity, a lever disc electrically connected with the knife switch, a plurality of contact plates arranged arcuate about the axis of the lever disc, the first, third, fifth etc. contact plate being electrically connected with the electro magnet, a plurality of shifting electromagnets, a bell crank lever pivotally mounted, one of the arms of each lever being pivotally connected with one of the clutches on the shifting shafts, the other arm of each bell crank lever being pivotally connected with the armature of one of said shifting magnets so that the bell crank lever will be pivoted upon energization and its energization of said shifting magnet and thereby moving the corresponding clutch into and out of engagement with the corresponding shifting lever, the second, fourth, sixth etc. contact plate being electrically connected with the corresponding shifting magnet, a contact lever rigidly connected with the lever disc and adapted upon rotation of the lever disc to contact with the contact plates, a second lever on the contact disc, a bridge contact on said second lever, a pair of contact posts adapted to contact with the contact bridge, when the first lever contacts with the first contact plate, one of said contact posts being electrically connected with the knife switch, a double rotary switch, the second contact post being connected with one of the poles of the double rotary switch, a ratchet disc arranged back to back with the lever disc and a friction disc arranged between the two discs and connecting the same frictionally, a ratchet electromagnet having a hook member adapted to engage the teeth of the ratchet disc when the magnet is energized, the said magnet being grounded, a conductor connecting a second pole of the double rotary switch with the ratchet magnet so that when the two mentioned poles are connected, the ratchet magnet will be energized, a ring contact mounted on the motor driven shaft, a brush permanently contacting with said ring contact, a conductor connecting said brush with the first pole of the second pair of poles of the rotary switch, the other pole of the second pair being connected with the source of electricity, an arcuate contact on the motor driven shaft, an annular insulation member between the arcuate contact plate and the annular contact plate on the motor driven shaft, said two contact plates being electrically connected, a second brush usually riding on the annular insulation but adapted to contact with the arcuate contact plate during the rotation of the motor driven shaft, said second brush being electrically connected with the first mentioned magnet.

7. In a device of the class described in combination with an automobile having transmission gears a plurality of shifting shafts extending concentrically to each other, means on each shifting shaft for shifting one of the transmission gears upon rotation of the corresponding shaft, a shifting lever rotatably mounted on each shifting shaft, a clutch on each shifting shaft adapted to engage the corresponding shifting lever and to couple it with the corresponding shifting shaft, a shifting motor, a source of electricity, a conductor leading from said source to said motor, a normally open switch in said conductor, an electromagnet adapted to close said switch when the electromagnet is energized, a knife switch connected with the source of electricity, a lever disc electrically connected with the knife switch, a ratchet disc arranged concentrically and back to back with said lever disc, a friction disc arranged between the two other discs and connecting them frictionally with each other, said three discs being rotatably mounted, a pair of levers rigid on the lever disc, a plurality of contact plates arranged in an arch around the axes of the three discs, the first contact lever being adapted to contact in rotation with each of the contact plates, the first, third, fifth, etc. contact plate being electrically connected with the above mentioned electromagnet, a plurality of shifting magnets, a bell crank lever for each clutch, one arm of each bell crank lever engaging the corresponding clutch and adapted to move the same into and out of engagement with the corresponding shifting lever, the second arm of each bell crank lever being connected with the corresponding shifting magnet so that the bell crank lever will be pivoted when the corresponding magnet will be energized, means for returning the lever in its original position when the corresponding magnet is disenergized, the second, fourth, sixth, etc. contact plate being electrically connected with the corresponding shifting magnet, a bridge contact on the second lever arm, a pair of contact posts adapted to contact with the bridge contact when the first lever arm is in contact with the first contact plate, one of said posts being electrically connected with the knife switch, a rotary double switch, a ratchet electromagnet, a hook member on said magnet, adapted to engage one of the teeth of the ratchet disc every time when the electromagnet is energized but to be kept out of engagement when said magnet is disenergized, the pole of the double switch corresponding to the above mentioned pole being electrically connected with the ratchet magnet, a ring contact on the motor driven shaft but insulated therefrom, a brush permanently contacting with said annular contact, a conductor connecting said brush with the first pole of the second pair of the rotary switch, the second pole of the second pair being connected with the source of electricity, an annular insulation surrounding the annular contact plate, an arcuate contact plate on said annular insulation electrically connected with the annular contact plate, a spring pressed brush normally riding on the annular insulation but adapted to contact with the arcuate contact during rotation of the motor driven shaft, said spring pressed brush being electrically connected with the first mentioned electro motor, an insulation plate, a plurality of conically shaped openings in said plate and arranged in an arc so that the second lever can move over said openings, a contact plate fastened on the under side of the insulation plate longside of each conical opening, a double armed lever pivotally mounted inside of each opening, a spring fastened with one of its ends to the insulation plate and with its other end to the part of the adjacent lever urging said lever into contact with the adjacent contact plate fastened to the under side of the insulation plate, said second lever arm being adapted to contact with the upper end of each double lever arm, if said lever moved in one direction, and adapted to engage one of said double levers after the other one if rotated in opposite direction and thereby to pivot the double lever out of contact with the contact plate underneath the insulation plate, one of the end contact plates being electrically connected with the ratchet magnet, a second spring pressed brush adapted to contact with the arcuate contact plate, and a conductor connecting said second spring pressed brush with the other end contact plate arranged underneath the insulation plate.

8. In a device of the class described an automobile, a set of transmission gears in said automobile, a plurality of shifting shafts extending concentrically to each other, means on each shifting shaft for engaging one of said transmission gears, and shifting the same upon rotation of said shaft, a shifting lever rotatably mounted on each shifting shaft, a clutch on each shifting shaft adapted to engage the corresponding shifting lever and thereby to couple the same to the corresponding shifting shaft, a shifting motor, a source of electricity, a conductor connecting said source with said motor, a normally open switch in said conductor, an electromagnet adapted to close said switch when said magnet is energized, a knife switch connected with the source of electricity, a lever disc electrically connected with said knife switch, a ratchet disc arranged concentrically and back to back with the lever disc, a friction disc arranged between said two discs and connecting them frictionally, the three discs being rotatably mounted, a plurality of contact plates arranged in an arch about the axes of the three discs, an electrolever rigid on the lever disc and adapted to contact with the contact plates in rotation when the disc is rotated, the first, third, fifth etc., contact plate being electrically connected with the electromagnet to energize the same, a shaft adapted to be rotated by the shifting motor and extending parallel to the shifting shafts, a plurality of lifting cams on said shaft adapted to engage and lift one of said shifting levers, a plurality of shifting electromagnets, each electromagnet having a sliding armature, a bell crank lever pivotally mounted, one of the arms of each lever being pivotally connected with the armature of the adjacent shifting magnet, means on each armature for urging the same away from the magnet when the same is not energized, the second arm of each bell crank lever being engaged with a corresponding clutch on a shifting shaft and adapted to move said clutch into engagement with the corresponding shifting lever, thereby coupling the same to the corresponding shaft, a resting plate pivotally and slidably mounted, and arranged in the path of travel of the shifting levers when the same are pivoted by the lifting cams and permitting the shifting levers to pass said resting plate, means for returning the shifting levers into the direction opposite to the one in which said levers are moved by the lifting cams, means for preventing the resting plate from pivotal movement into the direction opposite the one in which said plate is moved by the shifting levers under the pressure of the lifting cams, a plurality of notches provided in said resting plate, a cam nose on said plate, a cam disc rigidly mounted on the motor driven shaft and adapted to engage said cam nose and to move the plate lengthwise thereby bringing the shifting levers into registration with the notches in the plate and permitting the levers to be rotated into the opposite direction to that in which the cams did rotate said levers, the second, fourth etc. contact plate being electrically connected with the corresponding shifting magnets, a ratchet electromagnet, a hook member on said magnet adapted to engage one of the ratchet teeth on the ratchet disc when said electromagnet is energized but to stay out of engagement with said teeth as long as the magnet is not energized, a second contact lever on the lever disc, a bridge contact on said second lever, a pair of contact posts adapted to contact with said bridge, one of said posts being electrically connected with the knife switch, a double rotary switch, one of the poles of said switch being electrically connected with the second post, an annular contact mounted on the motor driven shaft but insulated therefrom, a brush being permanently in contact with the annular contact, the pole of the rotary switch corresponding to the first pole being electrically connected with the ratchet electromagnet, said brush being electrically connected with the first pole of the second pair of the rotary switch, the corresponding pole of the second pair being connected with the source of electricity, an annular insulation surrounding the annular contact, an arcuate contact plate on said annular insulation but electrically connected with the annular contact, a spring pressed brush adapted to contact with the arcuate plate during rotation of the motor driven shaft, said brush being electrically connected with the first mentioned electromagnet, a second spring pressed brush also adapted to contact with the arcuate plate during rotation of the motor driven shaft, an insulation plate, a plurality of conical holes in said plate and arranged in an arch about the axes of the three discs, the second lever on the lever disc being adapted to move over said holes upon rotation of the disc, a contact plate located longside of each of the conical openings underneath the insulation plate, a two armed lever pivotally mounted in the conical holes, a spring for each double armed lever, one of the ends of said spring being connected with the insulation plate and the other with the lower arm of the adjacent double armed lever, urging the same into contact with the adjacent contact plate arranged underneath the insulation plate, a last contact plate on one end being electrically connected with the ratchet magnet, the other end contact plate being electrically connected with the second spring pressed brush and with the conductor leading from the first spring pressed brush to the first mentioned electromagnet, the third lever arm rigidly connected with the two first mentioned lever arms, and a regulator adapted to be driven by the driving wheels of the automobile, the third lever arm being connected with the sliding member of the regulator so that the three arms will be pivoted according to the speed with which the regulator is being driven by the driving wheels of the automobile, the second lever arm being adapted to slide over the double lever arms and contact therewith in rotation when the three lever arms are moved into a certain direction, but to engage in rotation each of said double armed levers and pivot the same out of contact with the corresponding contact plate underneath the insulation plate when being rotated into the opposite direction.

In witness whereof I affix my signature.

ARTHUR ZINECKER.